(No Model.) 12 Sheets—Sheet 1.
F. PRAUNEGGER.
TYPE DISTRIBUTING MACHINE.

No. 524,693. Patented Aug. 14, 1894.

Witnesses.
B. W. Miller
C. W. Brooke

Inventor
Ferdinand Praunegger
By his Attorney.
Baldwin Davidson
& Wight

(No Model.)

F. PRAUNEGGER.
TYPE DISTRIBUTING MACHINE.

No. 524,693. Patented Aug. 14, 1894.

Fig. 3.

Witnesses:
B. W. Miller
C. W. Brooke

Inventor:
Ferdinand Praunegger,
By his Attorneys (No Model.) 12 Sheets—Sheet 3.

F. PRAUNEGGER.
TYPE DISTRIBUTING MACHINE.

No. 524,693. Patented Aug. 14, 1894.

*Fig. 4.*

Witnesses
B. W. Miller
C. W. Brooke

Inventor
Ferdinand Praunegger
By his Attorney
Baldwin Davidson & Wight (No Model.) 12 Sheets—Sheet 4.
F. PRAUNEGGER.
TYPE DISTRIBUTING MACHINE.

No. 524,693. Patented Aug. 14, 1894.

Fig. 5.

Witnesses
B. W. Miller
C. W. Brooks

Inventor
Ferdinand Praunegger,
By his Attorneys
Baldwin Davidson & Wight (No Model.) 12 Sheets—Sheet 5.

F. PRAUNEGGER.
TYPE DISTRIBUTING MACHINE.

No. 524,693. Patented Aug. 14, 1894.

Witnesses
B. W. Miller
C. M. Brooke

Inventor
Ferdinand Praunegger,
By his Attorneys
Paulson Davidson & Wight

(No Model.) 12 Sheets—Sheet 7.

F. PRAUNEGGER.
TYPE DISTRIBUTING MACHINE.

No. 524,693. Patented Aug. 14, 1894.

Witnesses
B. W. Miller
C. W. Brooke

Inventor
Ferdinand Praunegger,
By his Attorneys
Baldwin Davidson Wight (No Model.) 12 Sheets—Sheet 8.

F. PRAUNEGGER.
TYPE DISTRIBUTING MACHINE.

No. 524,693. Patented Aug. 14, 1894.

(No Model.)  12 Sheets—Sheet 9.
F. PRAUNEGGER.
TYPE DISTRIBUTING MACHINE.

No. 524,693. Patented Aug. 14, 1894.

Witnesses
B. W. Miller
C. W. Brooke

Inventor
Ferdinand Praunegger,
By his Attorneys
Baldwin Davidson Wight (No Model.) 12 Sheets—Sheet 10.

F. PRAUNEGGER.
TYPE DISTRIBUTING MACHINE.

No. 524,693. Patented Aug. 14, 1894.

(No Model.) 12 Sheets—Sheet 11.
F. PRAUNEGGER.
TYPE DISTRIBUTING MACHINE.

No. 524,693. Patented Aug. 14, 1894.

(No Model.) 12 Sheets—Sheet 12.

F. PRAUNEGGER.
TYPE DISTRIBUTING MACHINE.

No. 524,693. Patented Aug. 14, 1894.

Fig. 33.

Witnesses.
B. W. Miller
C. W. Brooke

Inventor.
Ferdinand Praunegger,
By his Attorneys
Baldwin Davidson & Wight

UNITED STATES PATENT OFFICE.

FERDINAND PRAUNEGGER, OF GRAZ, AUSTRIA-HUNGARY, ASSIGNOR OF ONE-HALF TO HEINRICH LOUIS BENNO TOOBE, OF HULL, ENGLAND.

TYPE-DISTRIBUTING MACHINE.

SPECIFICATION forming part of Letters Patent No. 524,693, dated August 14, 1894.

Application filed March 12, 1894. Serial No. 503,388. (No model.) Patented in England January 6, 1893, No. 299.

*To all whom it may concern:*

Be it known that I, FERDINAND PRAUNEGGER, a subject of the Emperor of Austria-Hungary, residing at No. 4 Stempfergasse, Graz, in the Empire of Austria-Hungary, have invented certain new and useful Improvements in Type-Distributing Machines, (for which I have received Letters Patent in Great Britain, No. 299, dated January 6, 1893,) of which the following is a specification.

The improvements relate to a type distributing machine such as is described in the specification of my German patent, No. 45,056, in which type are delivered one by one from the page or column to be distributed into a carrier mounted on an arm which can be turned to the right or left around a vertical axis to bring the carrier over any one or other of a series of channels into which the type are to be placed and to then open the carrier and allow the type to drop into the channel where it is set up in line with any type that the channel already contained. To draw the arm to the right or left, cords or tapes attached to it near its end are employed as hereinafter described. This allows of the bar or arm being made very light, its movement can therefore readily be arrested at any desired point as its momentum will be but small.

Figures 1 to 33 of the annexed drawings show a complete type distributing machine in which the invention is embodied.

Fig. 12 shows the mechanism represented in Fig. 5 on a larger scale, while Fig. 19 shows top view of the apparatus by which the page or column of type to be distributed is carried and by which the type are detached one by one; Fig. 21 a section on line $Z^3—Z^3$ and Fig. 22 a section on line $Z^2—Z^2$ in Fig. 19. Figs. 23 and 24 are front views of that part of the apparatus which serves to detach the letters.

Figures 19, 21, 22, 23, 24:
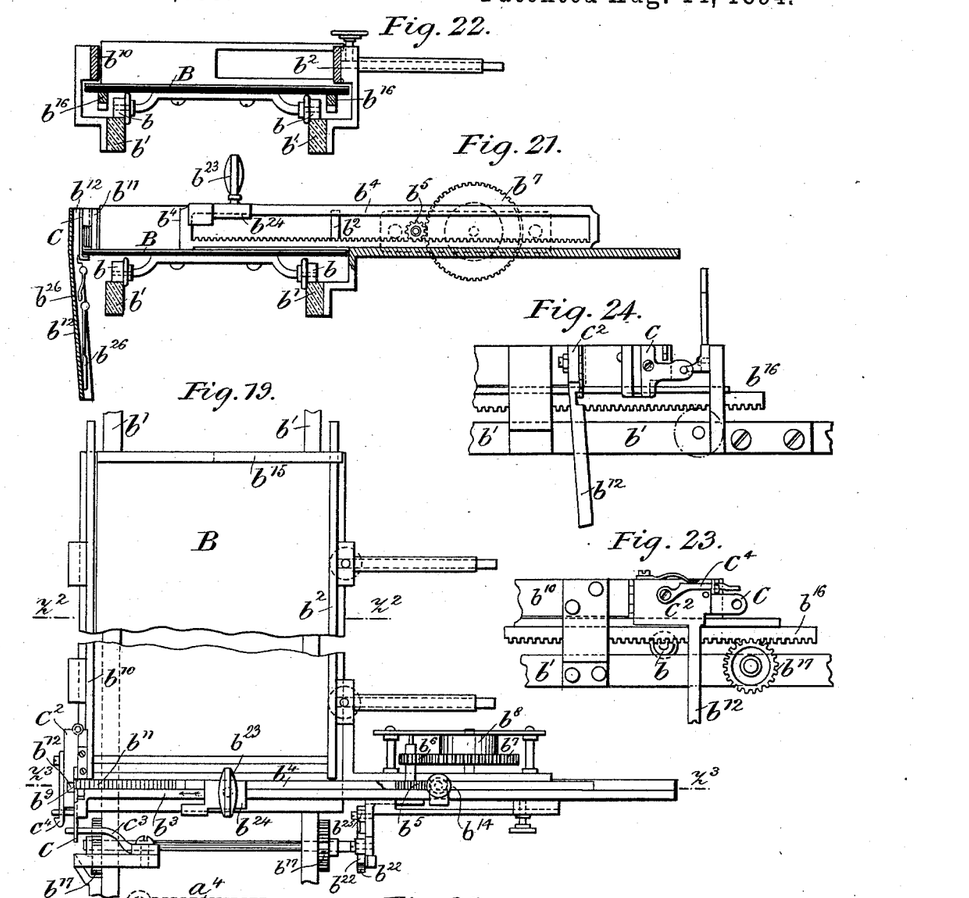
Figures 20, 25:
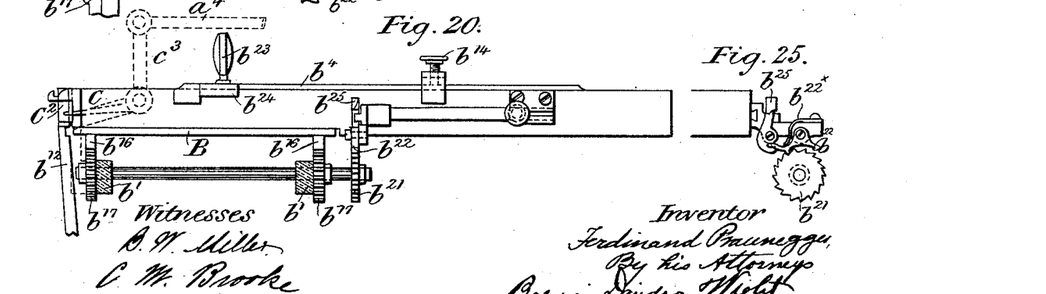
Fig. 20 a side view.
Fig. 25 represents detail belonging to Fig. 20.

In general, without entering into the separate functions of the various mechanisms, the machine, imitating the movements of the human arm, performs the distributing of the letters in the following manner: The page of type to be distributed is placed on plate B Figs. 1 and 19 where a pusher $b^4$ pushes the letters one by one into the detaching apparatus C. At each rotation of the axis of the machine a letter is detached and falls into the carrier D which is mounted upon the transport arm D'. This transport arm then brings the receptacle over whichever of the type reservoirs K is to be filled with that particular letter and here the receptacle is automatically opened and the letter is allowed to slip down into the type reservoir. All these movements are brought about by the operator pressing upon the key of a keyboard E upon which is marked the same letter as that conveyed to the type reservoir. After having deposited the letter the arm automatically returns with the receptacle to its central position.

Figure 1:
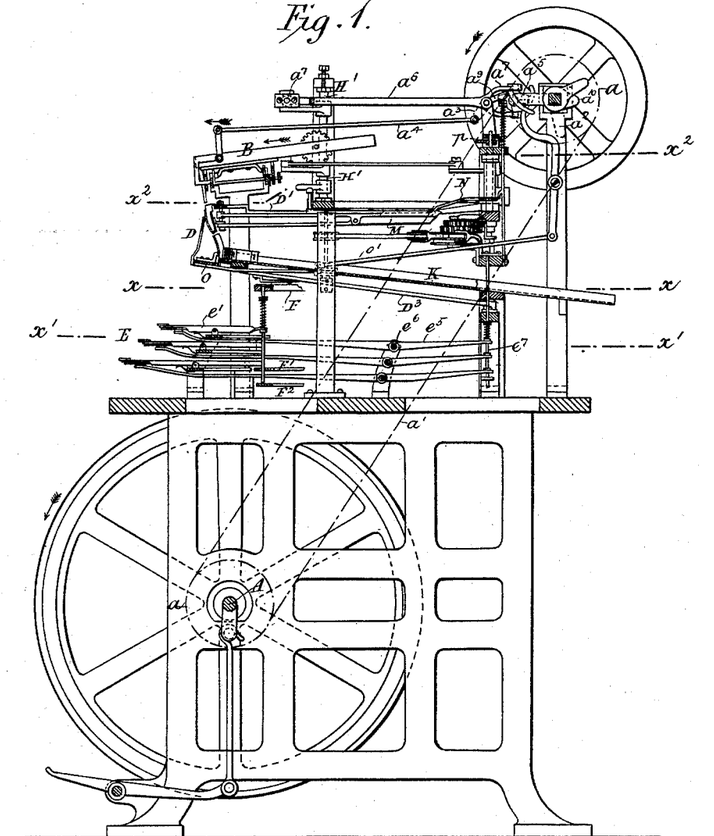
Fig. 1 is a side elevation of the machine partly in section.

The machine is set in motion by a cranked axle A Fig. 1 which is driven by means of a treadle and from which motion is transferred by an endless chain $a'$ (Fig. 1) and chain wheels $a$ to a cranked axle $A'$ which is situated in the upper part of the machine and from which the various parts of the machine are set in motion.

Figure 2:
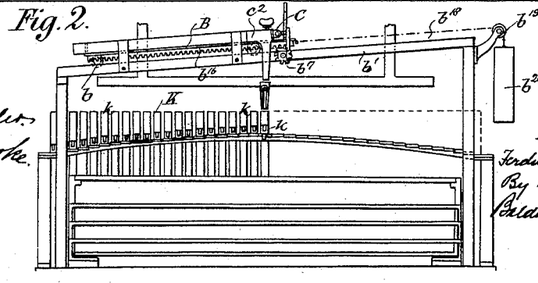
Fig. 2 a front view of the type receiving boxes and the apparatus for carrying the page or column of type to be distributed.
Figure 3:
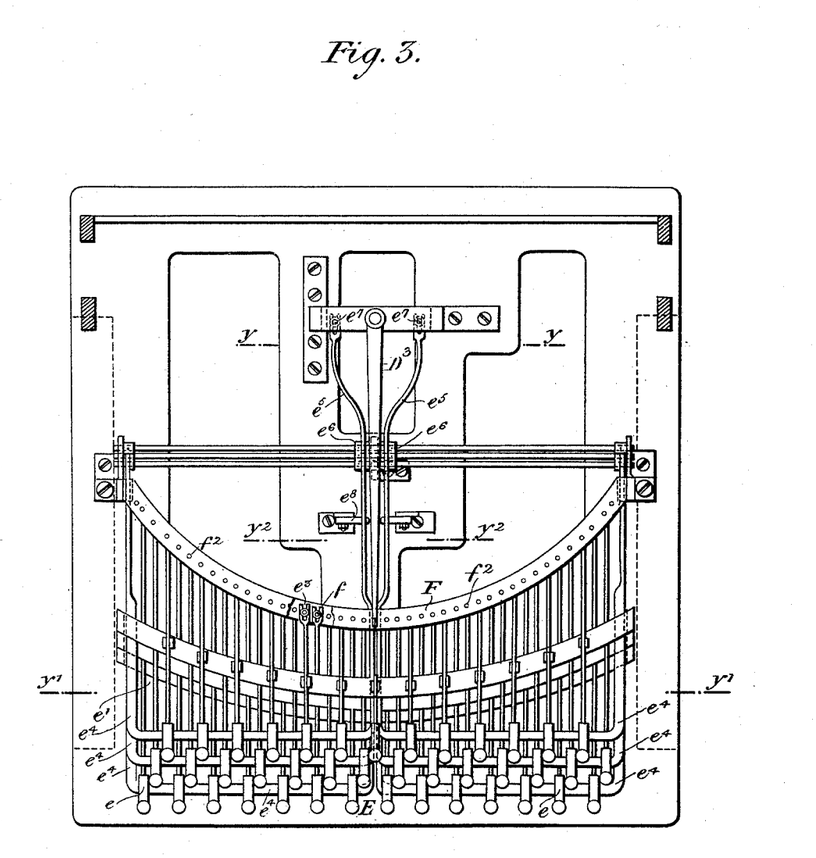
Fig. 3 is a horizontal section in the direction of line $x—x$ in Fig. 1 representing top view of the keys.
Figures 26, 27, 32:
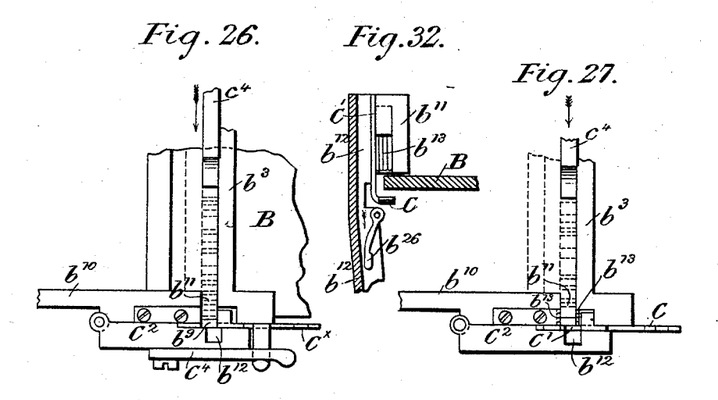
Figs. 26 to 32 show the apparatus for detaching the letters (represented in Figs. 23 and 24) on a larger scale, the order of the figures illustrating the gradual process of detaching the letters.
Figure 28:
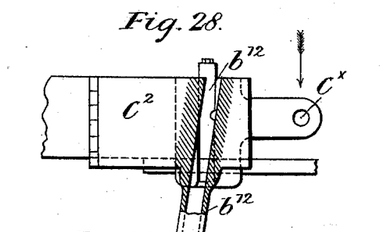
Figure 31:
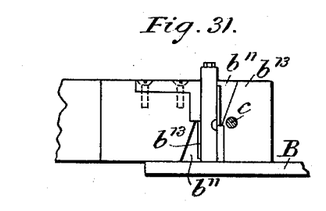
Figure 33:
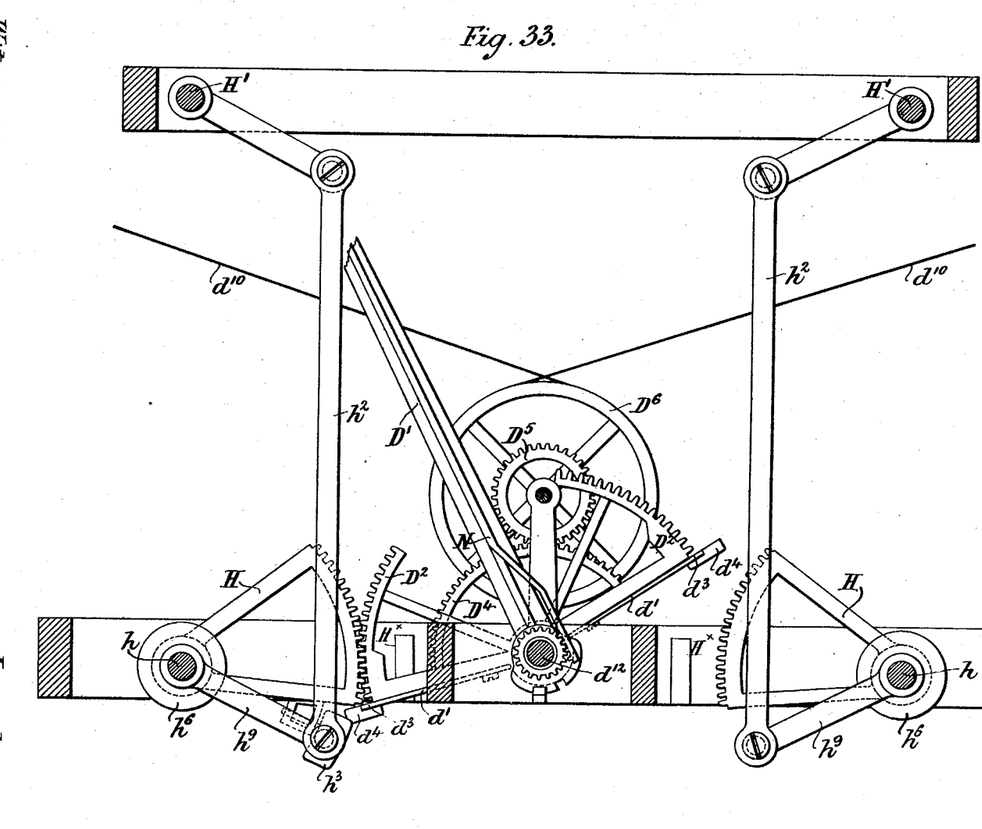
Fig. 33 shows the mechanism (represented in Figs. 5 and 12) in the position which it occupies when transporting the letters into a box or reservoir of the left half of the machine.

The page or column of type which is to be distributed is placed upon a platform B (see Figs. 6 and 8 and 19 to 22) provided with rollers $b$ which run on rails $b'$—above one side of this platform is a fixed side plate or wall $b^{10}$ and above the opposite side of the platform is another plate $b^2$ which can be moved toward or from the fixed plate $b^{10}$ and locked in any desired position. The page of type is moved forward between these two side plates. In order that the letters may lean against one another the platform is inclined in two directions as may best be seen from Figs. 2 and 8. The foremost line of type is held up to the end wall $b^3$ and a pusher $b^4$ is moved forward against the end type at one side of this line. The pusher $b^4$ Figs. 8, 21 and 26 has on it a toothed rack into which gears a pinion $b^5$. On the spindle of this pinion is a second pinion which gears with a cog wheel $b^7$. This cog wheel has on it a case $b^8$ (see Fig. 19) containing a coiled spring which is wound up when the pusher is pressed back and tends always to press the pusher forward. The result of this is that the foremost letter $b^9$ of the foremost line of type is pressed toward the exit passage through which it has to be dropped. Between the end of the fixed side plate $b^{10}$ and the end stop plate or wall $b^3$ (Figs. 19 and 26) is a space forming a channel $b^{11}$ into which the foremost letters of the foremost line are pushed forward by the pusher. The channel at its end is widened out on two opposite sides—on one side it is the upper half of the side wall and on the other side it is the lower half of the wall that is cut away to so widen out the channel as shown in Fig. 31. At the end of the channel $b^{11}$ is the exit channel $b^{12}$ which as shown in Fig. 28 is inclined to and crosses the channel $b^{11}$. In consequence of this arrangement the foremost letter cannot so long as it remains in a vertical position enter the channel $b^{12}$ as a triangular projection stands in front of it at the upper part of one side of the entrance to the channel and a corresponding projection at the lower part of the opposite side. Between the end of the channel $b^{11}$ and the entrance to the channel $b^{12}$ is a thin plate C the thickness of which corresponds to the thinnest letter. In the plate is a slit $C'$ of the same width as a letter. The plate can be rocked around a pin $c$ so as either to bring the slit $C'$ to coincide with the channel $b^{11}$ or with the channel $b^{12}$. When it is brought into a position to coincide with the channel $b^{11}$ the foremost type being as above explained constantly pressed forward enters the slit $C'$. When the slider is rocked so as to bring the slit $C'$ to coincide with the channel $b^{12}$ the letter which has entered the slit is thereby tilted and is then free to drop down. When the slit $C'$ is in this position as shown in Fig. 30 the next type cannot pass into it but so soon as the plate is again rocked to bring the slit $C'$ to coincide with the channel $b^{11}$ the type advances into it.

The plate C as above mentioned is only as thick as the thinnest letter but the thickest type can be tilted by the plate the enlargements above mentioned at the two opposite sides of the outer end of channel $b^{11}$ allowing it to do so.

In order to insure that only one letter at a time shall be tilted by the plate C springs $b^{13}$ (see Figs. 27 and 32) are made to bear against both sides of the type close up to the plate C. These springs are split into several parts the breadth of each part corresponding to the difference between the thickness of successive sizes of type.

In the drawings it has been assumed that there are four sizes of letters, viz: whole squares, three quarter squares, half squares, and quarter squares for which reason the springs $b^{13}$ have been split into four parts. If under these circumstances a three quarter square entered the slit $C'$ of the plate C and was tilted by it two parts of each spring would give way while the remaining parts of the spring would keep a quarter square that might happen to follow in its former position.

Figure 29:
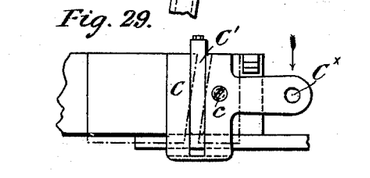
Figure 30:
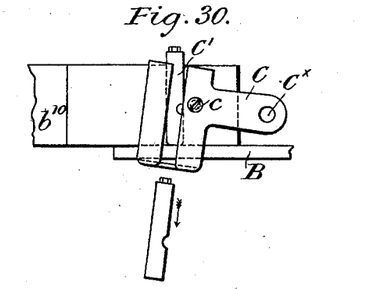

The plate C is rocked to and fro once for each revolution of the cranked axle $A'$ through the action of a tappet $a^2$ (Figs. 1 and 6) upon it. This tappet strikes against a bent lever $a^3$ (Figs. 1, 6, 8 and 15) which by means of a connecting rod $a^4$ (Figs. 1, 6, 8 and 20) is connected with one arm of a second bent lever $c^3$ (Fig. 8) the other arm of which enters an eye $C^\times$ in the plate C—(see Figs. 28, 29 and 30).

When a line space used for dividing one line of type from another is to be removed the pusher $b^4$ is locked by a binding screw $b^{14}$ (see Figs. 19 and 20) and a door $c^2$, which previously was kept closed by a lever catch $c^4$, is opened. The door $C^2$ is shown closed in Fig. 23 and open in Fig. 24.

In order, when a whole line of type pushed forward by the pusher $b^4$ has been distributed, that the next line may be brought into position to be in its turn acted on by the pusher the platform B upon which the column or page of type rests is made movable but the side plates or walls $b^2$ $b^3$ and $b^{10}$ which keep the type from falling are fixed and the platform moves forward underneath them. The fourth side $b^{15}$ which is held up against the last line of type moves with the platform.

The platform B is mounted on rollers $b$ which run on rails $b'$ and has on its under side two toothed racks $b^{16}$ into which cogged wheels $b^{17}$ gear (Figs. 2, 19, 20 and 23). The platform B is drawn forward by a cord $b^{18}$ (Figs. 2 and 6)—the cord passes over a pulley $b^{19}$ and carries a weight $b^{20}$. The shaft on which the cogged wheels $b^{17}$ are fixed carries an escapement wheel $b^{21}$ (Figs. 19, 20 and 25) and an anchor escapement lever $b^{22}$ (see Fig. 25) prevents the turning of this escapement wheel.

When a line has been completely distributed the pusher $b^4$ is pulled back as far as it will go by the handle $b^{23}$ so that the spring in the case $b^8$ on the wheel $b^7$ is wound up, at the same time the projection $b^{24}$ which stands out from the pusher hits a latch $b^{25}$ (Figs. 20 and 25) which lifts one tooth of the anchor escapement $b^{22}$ out of the escapement wheel $b^{21}$, while the other tooth of the escapement lever catches another tooth of the escapement wheel. During this time the platform is drawn forward by the effect of the weight. Afterward when the pusher $b^4$ has been released the anchor escapement lever is turned back to its original position by a spring $b^{22\times}$ (see Fig. 25) and the platform B has then been moved forward the distance required.

Figures 8, 9, 10, 11:
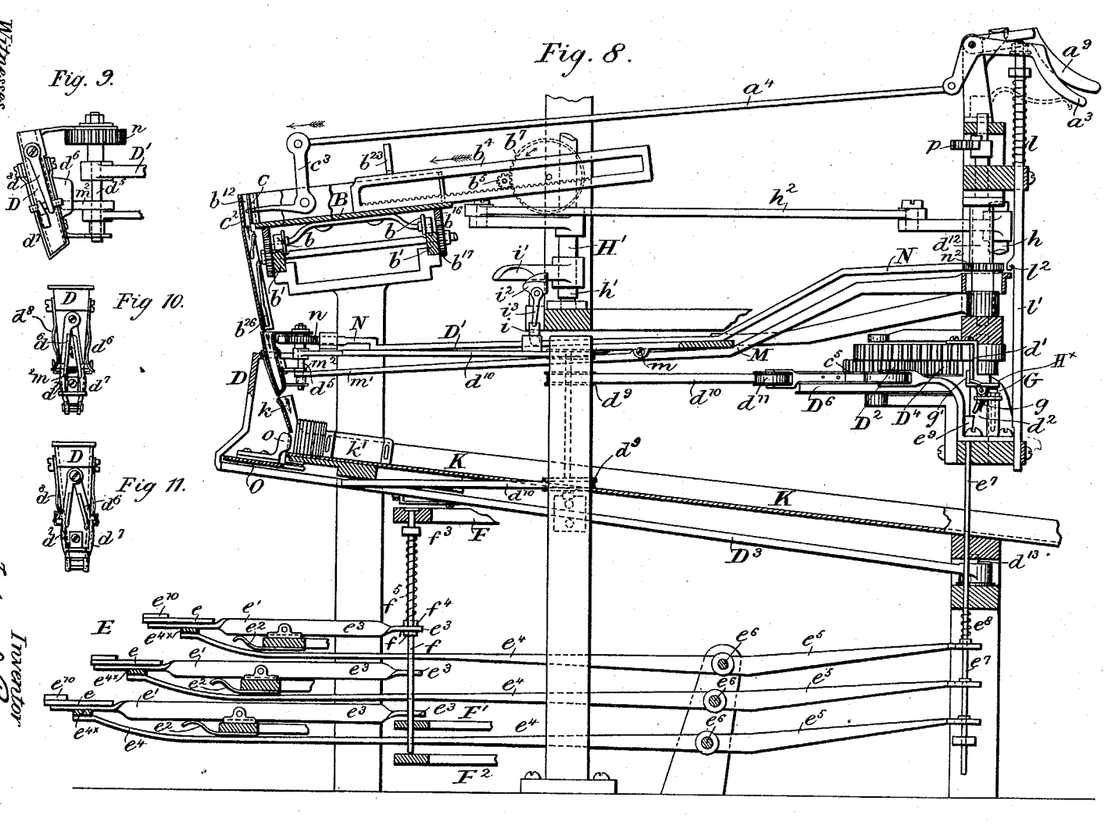
Fig. 8 shows the upper part of the machine on a larger scale.
Figs. 9, 10 and 11 give different views of that part in which the type is conveyed.

As each lever is in the manner above described dropped through the exit channel $b^{12}$ it passes into the receptacle D (Figs. 1, 2, 5, 8 and 12) and in it it is conveyed and deposited into the box or type reservoir which is to receive it. In order that the letter while falling may remain in its original position, movable tongues $b^{26}$ which guide the letter safely are placed in the channel $b^{12}$ (Fig. 8).

The particular box or type reservoir into which the type is caused to be dropped depends as above mentioned upon which of the finger keys of the key board E Figs. 1, 3, 5 and 7 is depressed by the operator.

In order that the foot working the pedal and the hand pressing down the keys may keep time together, the mechanism is so arranged that the pressing down of a key has to be done at the time when the crank A is near its lowest point.

In the machine shown in the drawings the keys $e$ have been arranged in three rows and so that one projects over the other. In Figs. 1, 3, 4, 5 and 8, the arrangement of the keys can be clearly seen. Each key $e$ is at the end of one arm of a movable key lever $e'$, this lever is kept in the position shown in Figs. 1 and 8 by means of a spring $e^2$. The other arm $e^3$ (Figs. 3, 4 and 8) of these levers is forked and embraces a vertical pin $f$. These pins $f$ can be moved up and down through guide holes in plates F F' their lower ends are kept resting on the plate $F^2$. Each pin $f$ has on it a collar $f'$ upon which the forked lever end $e^3$ (Fig. 8) is supported and the pin is so held down. Under the upper plate F each pin $f$ has on it a second collar $f^3$ (see Fig. 8) which limits the extent to which the head of the pin can be raised above the plate F. A loose collar $f^4$ is placed upon each rod $f$ just above the forked end $e^3$ of the key lever $e'$ and between this loose collar $f^4$ and the upper fixed collar $f^3$ there is a coiled spring $f^5$ (Fig. 8) strong enough to lift the pin but which will yield when the collar $f^3$ comes against the under side of the plate F the pins will therefore always be raised to the same height and strong pressure upon the finger keys will not raise them beyond this.

Whenever any key in the right hand half of each row of keys is depressed it not only raises as above explained the particular stop $f$ which it has to raise but it also raises a pin $e^7$ and similarly if a key on the left hand side is depressed it raises another pin $e^7$ there being two such pins one acted on by the keys in the right hand half of the machine and the other by the keys in the left hand half.

Figure 4:
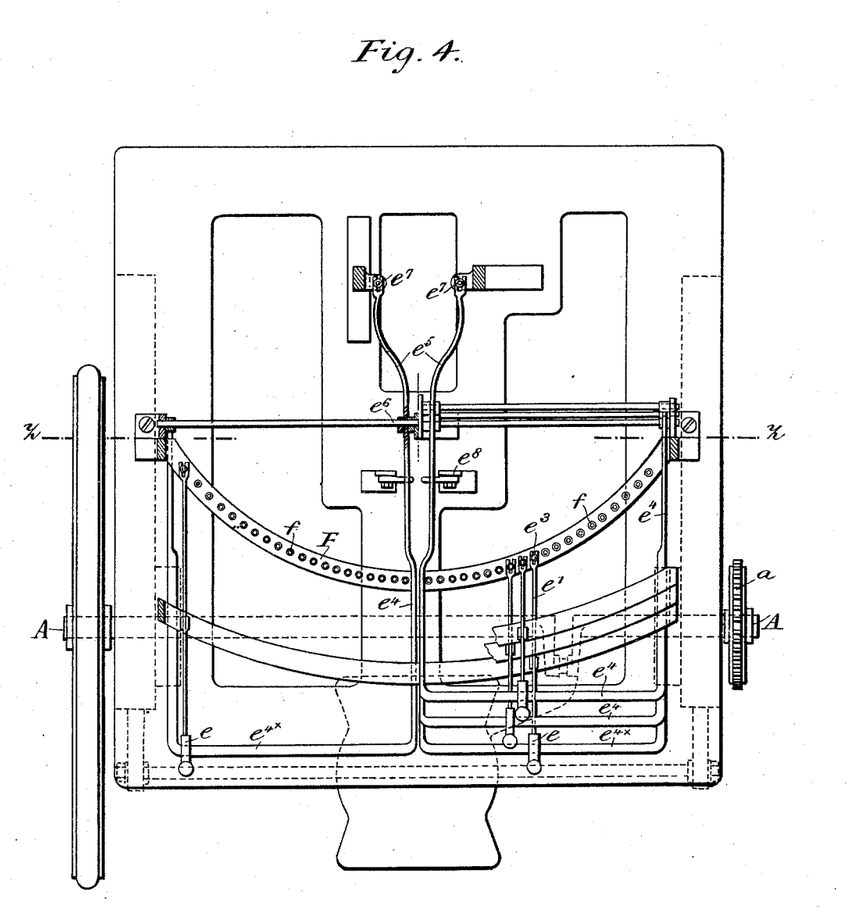
Fig. 4 is a horizontal section in the direction of line $x'—x'$ in Fig. 1 representing the arrangement of levers under the keys.
Figure 5:
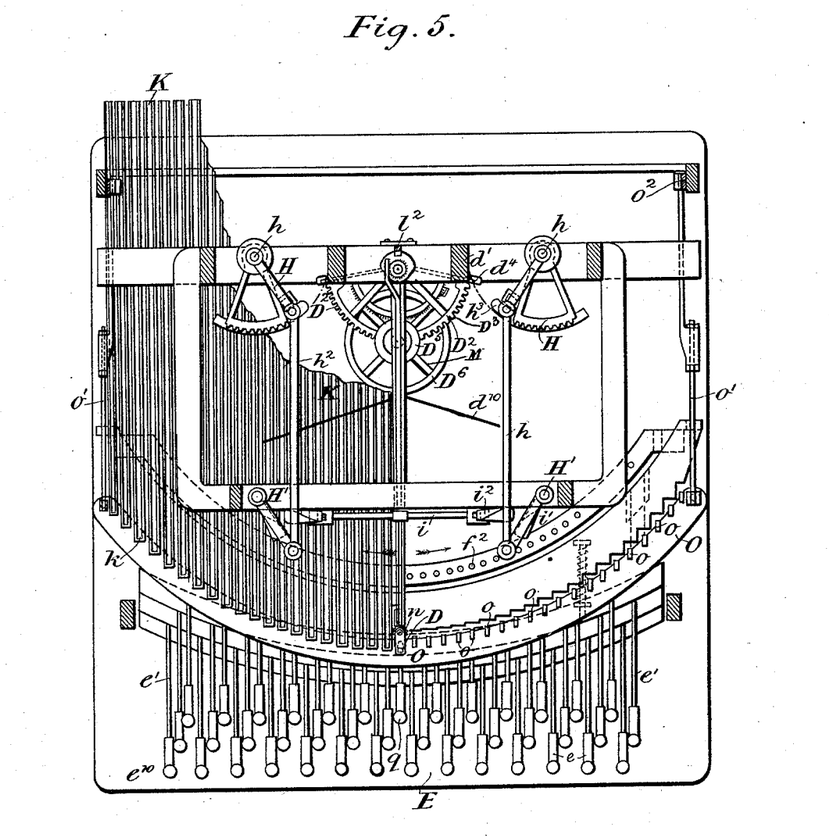
Fig. 5 a top view of mechanism by means of which the letters are conveyed to their respective boxes, the upper part above line $x^2—x^2$ in Fig. 1 being removed.
Figure 6:
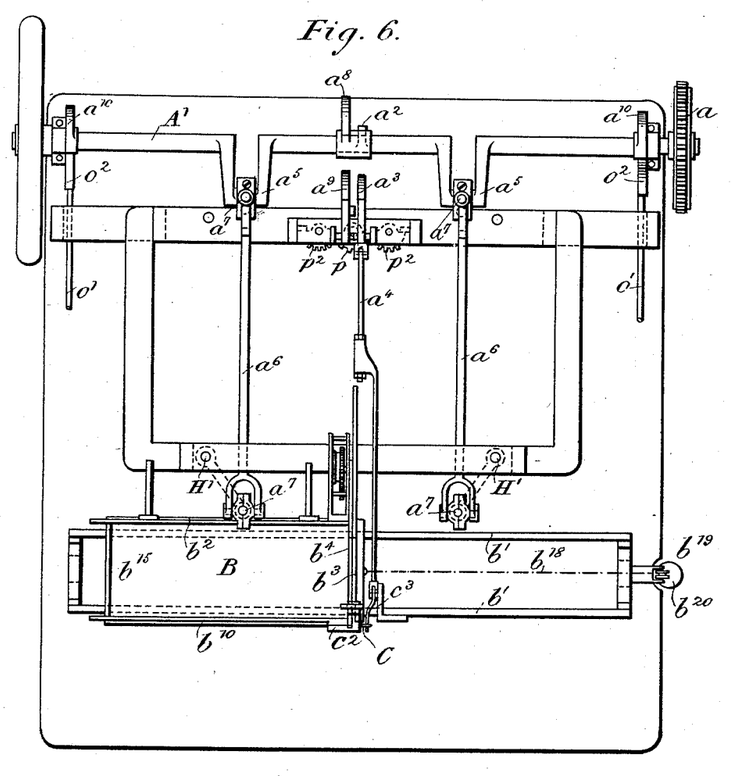
Fig. 6 shows top view of mechanism which works the arrangement for transferring the type, together with the apparatus which receives the page or column of type that is to be distributed.
Figure 7:
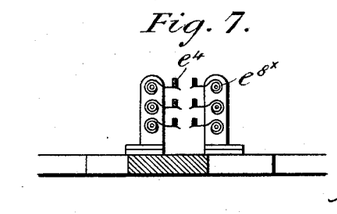
Fig. 7 a section in the direction $y^2—y^2$ in Fig. 3.

The raising of one or other of the pins $e^7$ is effected in the following manner: Under each half of each row of keys there lies a bar $e^{4\times}$ carried by arms $e^4$ from an axis $e^6$, another arm $e^5$ (see Figs. 1, 3, 4 and 8) extends back from this axis. The end of this arm $e^5$ is forked and embraces a pin $e^7$ and all the three levers which are one above the other embrace the same pin $e^7$ (Figs. 1, 4 and 8). There is also a collar on the pin just above each forked arm $e^5$ so that by touching any key in either of the three rows of keys the movable pin $e^7$ will be raised. A coiled spring $e^8$ presses the pin down again when the finger key is relieved from pressure. The arms $e^4$ are also upheld by springs $e^{8\times}$ as shown in Fig. 7. Therefore when a key is pressed down not only is a stop pin $f$ raised as above explained but in addition a pin $e^7$ is also raised. The raising of this pin brings into action the mechanism for setting the transport arm into movement to the right or left as will now be explained.

$D^2$ is a double toothed segment on both sides of it there are cog wheel sectors H (Figs. 12 and 15) to each of which a constant swinging to and fro rotating movement is given in the following manner: The segments H are fixed on vertical shafts $h$ from which project arms $h^9$ which by rods $h^2$ are coupled to corresponding arms on axes H' to which a to and fro revolving motion is imparted by arms upon them being coupled by rods $a^6$ (see Fig. 6) and universal joints $a^7$ to cranks $a^5$ on the continuously revolving shaft A'. Normally when the segments $D^2$ are at rest and the transport arm D' is in its central position the quadrants H swing to and fro without engaging with them but if a finger key is depressed one or other of them is made to engage with one or other quadrant H. This is done in the following manner:—Hinged to the quadrants $D^2$ are arms $d'$ (see Figs. 12, 14 and 15) normally these hang downward in the position shown on the right hand side of Fig. 15—but on the depression of a finger key one or other of them is raised into the position shown on the left hand side of this figure—when raised into this position it gets struck by the end of the quadrant H and is thereby turned a short distance until the two quadrants H $D^2$ gear together. The lifting of one or other of the arms $d'$ into a horizontal position is effected in the following manner by one or other of the rods $e^7$ being lifted by the depression of a finger key.

Figure 13:
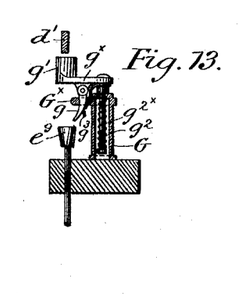
Figs. 13 and 14 represent details of same.

Just above the upper end of each vertical rod $e^7$ is the lower end of a small tongue $g$ (see Fig. 13) which is jointed to the under side of an arm $g^x$ which has a rod $g^2$ descending from it which can slide up and down in a fixed cylinder G. Surrounding the rod $g^2$ within this cylinder is a coiled spring $g^{2x}$ which presses the rod down into its lowest position. The small tongue $g$ passes down through a slot in an arm $G^x$ which extends from the top of the cylinder G and is pressed by a spring $g^3$ into the position shown in Fig. 13 so that its lower end comes above the head $e^9$ of the rod $e^7$. Standing up from the arm $g^x$ is a projection $g'$ which comes below the arm $d'$ which as before stated is hinged at the end of the toothed quadrants $D^2$. In this way it will be seen that whenever a finger key say on the left hand side of the machine is depressed the arm $d'$ carried by the toothed quadrant $D^2$ which is on this side of the machine will be raised also so that its end $d^3$ is brought into the path of the swinging quadrant H and when this quadrant swings toward the end $d^3$ this end gets struck by the end of the quadrant and the quadrants $D^2$ and H on the left hand side of the machine are brought into gear.

It is immaterial how far the rods $e^7$ are raised by the depression of the finger keys. If they are raised too high the tongues $g$ as they are lifted are drawn off from the heads of the rods by the action of the end of the slot in the arm $G^x$— and the rod $e^7$ may continue to rise while the tongue and part $g'$ in connection descend to their normal position. If the rod $e^7$ be not raised sufficiently to bring the arm $d'$ into a horizontal position it is raised into that position by an incline $h^3$ carried by each toothed quadrant H which when these segments swing inward toward one another catches under a projection $d^4$ (see Figs. 12 and 15) on the end of the arm $d'$ if the arm has been slightly raised and then completes the lifting of the arm into a horizontal position but if the arm $d'$ has not been raised at all the incline passes clear of the projection $d^4$ without raising it. The incline is hinged to the segment H so that on the backward movement of this segment it may pass the projection $d^4$.

By the turning of the toothed segments $D^2$ to the one side or the other a turning movement to the one side or the other is given to the transport arm $D'$ on its axis $d^{12}$ as will now be explained. The arresting of the movement of the arm is effected by one or other of the stop pins $f$ being raised so that it will be struck by an arm $D^3$ which turns on an axis $d^{13}$ concentric with the axis $d^{12}$ and which is at its extremity secured to the extremity of the arm $D'$.

Neither the arm $D'$ or the arm $D^3$ are in immediate connection with the toothed segments $D^2$ but these segments have fast with them a toothed segment $D^4$ which gears with a cog wheel $D^5$. This cog wheel has fast with it a double wheel or drum $D^6$ (see Figs. 1, 8, 12 and 15). The double wheel has secured to it the ends of a band $d^{10}$ which also passes over pulleys $d^9$ on vertical axes $d^{9x}$ at the two sides of the machine. On these axes are other pulleys over which pass bands $d^{10x}$ the ends of which are secured to the arms $D'$ $D^3$. $d^{11}$ are rollers pressed by coiled springs against the band $d^{10}$ to keep it tight.

By giving motion to the arms $D'$ $D^3$ by cords attached to them near their extremities in the above manner these arms may be made much lighter than they otherwise could be. The momentum therefore of the arms when put into movement will be diminished and they can therefore quickly be started into movement or brought to rest without shock.

When the transport arm $D'$ and arm $D^3$ have been put into movement in the above manner the movement continuous until the arm $D^3$ comes against and is arrested by a stop pin $f$.

Figure 14:
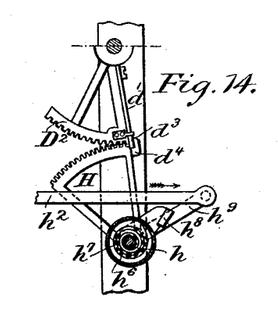
Figure 15:
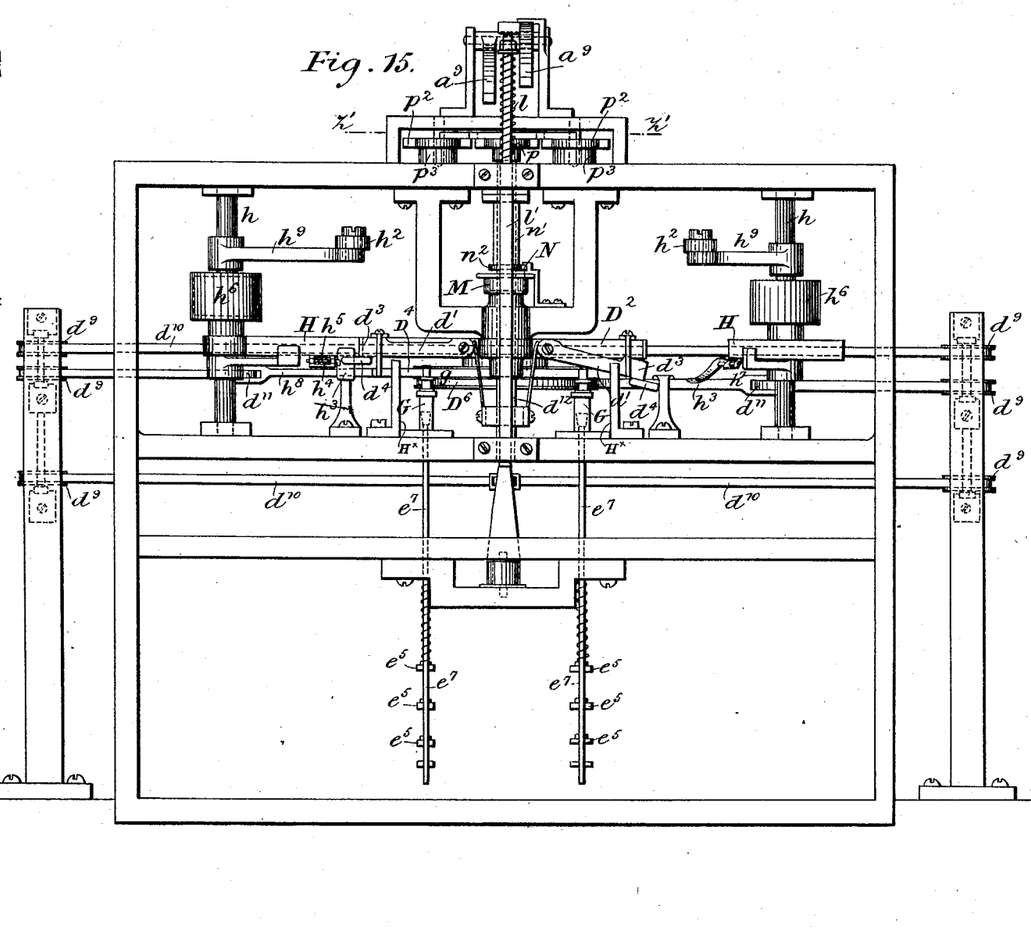
Fig. 15 is a back view of the upper part of Figs. 7 and 12 on a corresponding scale. Fig. $15^\times$ is an elevation of one of the stops $H^\times$.

In order to allow of the arms $D^3$ and $D'$ being stopped by any pin $f$ which may have been raised, the cog wheel segments H are not fast on their vertical shafts $h$, but are connected to them by a coiled spring $h^7$ contained within a case $h^6$ (Fig. 14). The spring holds the segment up to a stop $h^8$ which is fast on the shaft. The spring is strong enough to cause the arms $D'$ $D^3$ to turn but if $D^3$ is arrested at any point the spring yields while the shaft $h$ continues to turn. As the backward motion takes place the segment turns back with the shaft when the stop $h^8$ comes against it.

Figure 12:
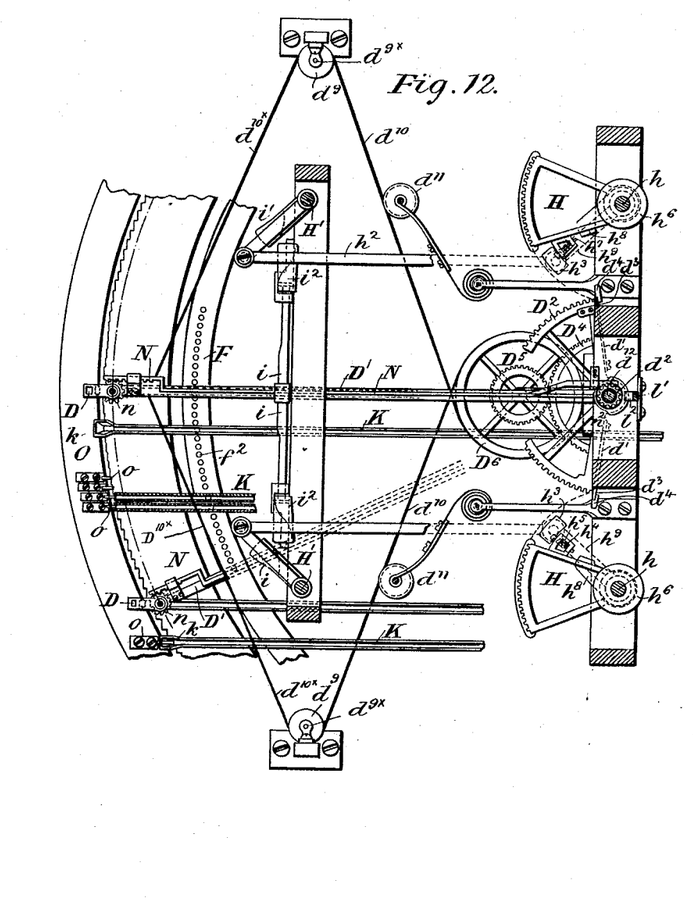
Figures 17, 18:
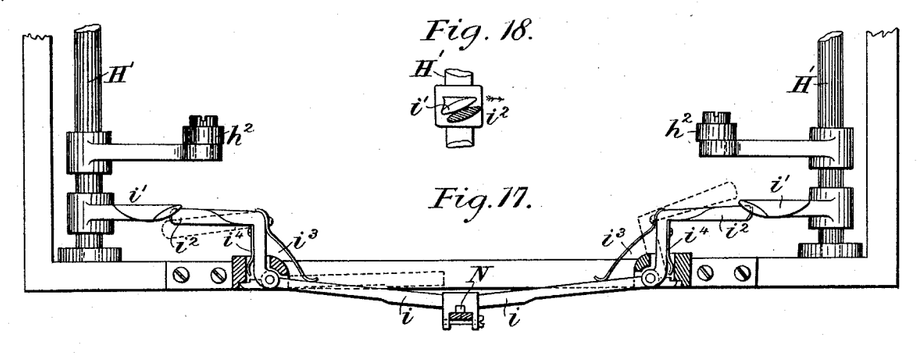
Fig. 17 shows front view of middle part of Figs. 8 and 12 which has for its object to hold the transport lever of the type in the middle position.
Fig. 18 represents some detail belonging to it.

As before stated the transport arm $D'$ is always started into movement from one central position. It is normally held in this position by the action of lever stops $i$ $i$ as best seen in Figs. 12 and 17—one stop coming against one side of the bar and the other against the other side. These stops are always lifted just before the toothed quadrants H come into a position in which they can be made to gear with the quadrants $D^2$. This is effected by the inclined ends of arms $i'$ on the vertical axes $H'$ then coming against the tail ends $i^2$ of the levers and depressing them. Immediately that the inclines have passed beyond the ends $i^2$ the catches $i$ are pressed back again by the springs $i^4$ into their normal position so as to be ready to again catch and hold the transport bar when it returns to its central position.

The arms $i$ $i^2$ are not rigidly connected but are jointed together by what is known as a knuckle joint—the spring $i^3$ normally keeps the two parts in the position shown in Fig. 17—in this way the arms $i'$ on the axes H' will on their return movement not lift the levers $i$ but will turn the levers $i^2$ into the position shown in dotted lines on the right hand side of Fig. 17—and when they have passed below these levers the levers will be turned back to their normal positions by the springs $i^3$.

When the transport arm D' has been set into motion and its motion has been arrested by the lower arm D³ striking against the projecting head $f^2$ of whichever pin $f$ has been raised the receptacle D carried by the arm D' has been brought over the receptacle into which the type which it is carrying is to be dropped. In order to cause the receptacle to then open and allow the type which it was carrying to drop from it the cranked axle A' is provided with a cam $a^8$ (Figs. 1 and 6) which at every revolution presses upon a two armed lever $a^9$ (Figs. 1, 6, 8 and 15). By this lever a rod $l'$ (see Fig. 8) previously held upward by a coiled spring $l$ is moved downward. As this takes place the rod $l'$ presses by a projection $l^2$ upon the rear end of a lever M which is jointed at $m$ to the under side of the transport arm D' so that the front end $m'$ of the lever is moved upward. Consequently the pin $m^2$ which can be slid upward along the axle $d^5$ of receptacle D Fig. 9 is slid upward between the two arms $d^6$ (Fig. 10) of the receptacle and presses apart the two bow shaped cheeks $d^7$ (Fig. 11) which with their lower parts prevent the letter from falling out. By springs $d^8$ which act upon the cheeks $d^7$ the receptacle is again closed as soon as cam $m^2$ moves downward. From the open receptacle D the letter falls into the opening $k$ of the box or type receiving channel below.

The type receiving channels K are set side by side parallel with one another with the ends into which the type are delivered in the arc of a circle concentric with the axis $d^{12}$ of the transport arm D'.

In order that the receptacle D (Figs. 8, 9 and 12) may always be kept in a position parallel with the type receiving channels K this receptacle is mounted on a cog wheel $n$ whose axis $d^5$ rests in bearings at the end of the transport arm D'. A toothed rack on a bar N gears with the cog wheel $n$ and another toothed rack on the same bar gears with a cog wheel $n^2$ which surrounds the shaft of the transport arm D' and which is fixed to the frame. When the arm D' turns to the right or left the bar N is thereby moved endwise in one or other direction and turns the receptacle into the positions required.

The pushing of the type along the type receiving channels K is effected by pushers $o$ (Figs. 8 and 12) there being one for each channel—all secured to one segment O. This segment is by rods $o'$ (Figs. 1 and 5) connected with levers $o^2$ upon which cams $a^{10}$ attached to crank axle A' act in such a manner that each time a letter has been deposited the pushers $o$ are moved forward into the channel K and push the letters forward.

Figure 16:
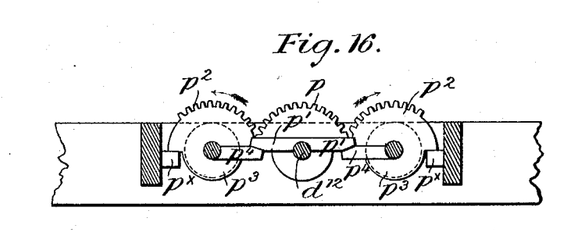
Fig. 16 a section and top view in the direction $Z'—Z'$ in Fig. 15.

To insure the arm D' being always brought back to its central position a cog wheel segment $p$ is keyed to the upper part of shaft $d^{12}$ (Figs. 8, 15 and 16)— arms $p'$ extend from opposite sides of this segment—other arms $p^4$ on other cog wheel segments $p^2$ bear against the arms $p'$ as shown at Fig. 16 when the segment $p$ is in a central position. The segments $p^2$ are by coiled springs contained in cases $p^3$ fixed to them tending to turn in the direction shown by the arrows. When in the position shown in Fig. 16 they are prevented from turning farther by projections upon them coming against fixed stops $p^x$.

To insure that the quadrants D² shall always be brought back accurately to their central position stops H$^x$ are provided for the arms $d'$ to come against.

The finger key $g$ (Fig. 3) for the central position of the transport bar has no connection with any pin $f$.

Any letter which is marked the same as the middle key $q$ always falls direct into its type receiving channel K without any movement being given to the transport bar.

What I claim is—

1. The combination of a carrier mounted on an arm capable of being turned around a vertical axis—a series of parallel channels into which the type are to be placed the ends of such channels into which the type are to be deposited being ranged in the arc of a circle in a plane just below the level of the bottom of the carrier—mechanism for delivering a type (from the page or column to be distributed) into the carrier each time that the carrier is brought into a position to receive it—a tape or cord secured to the arm and led in opposite directions around two pulleys at the two sides of the machine—a series of finger keys—a continuously revolving shaft and mechanism driven by this shaft put into gear by the depression of any finger key for first pulling upon one cord to draw the arm to one side and afterward upon the other cord to draw the arm back again.

2. The combination of a carrier mounted on an arm capable of being turned around a vertical axis—a series of parallel channels into which the type are to be delivered—the ends of such channels into which the type are delivered being ranged in the arc of a circle in a plane just below the level of the bottom of the carrier—mechanism for normally holding the arm in a line with the center of the arc—mechanism for delivering a type from the page or column that is being distributed into the carrier each time that the carrier is brought to its central position—a tape or cord secured to the arm and led in opposite directions around two pulleys at the two sides of the machine—a series of finger keys—a series of pins one for each finger key which are raised when the finger keys are depressed and serve as stops to limit the movement of the arm to the one side or the other—a continuously revolving shaft—mechanism driven by this shaft put into gear by the depression of any finger key for first pulling upon one cord to draw the arm to one side and afterward upon the other cord to draw the arm back again to its central position—mechanism for opening the carrier when the arm has been arrested by one of the pin stops to allow the type in the carrier to drop into the channel that it is then over and constantly reciprocating pushers for pushing forward the type which are dropped into the channels.

FERDINAND PRAUNEGGER.

Witnesses:
ANTON WETTENDORFER,
RUDOLF WERDOWITZ.